(12) United States Patent
Otake et al.

(10) Patent No.: US 9,618,314 B2
(45) Date of Patent: Apr. 11, 2017

(54) TAPE SCALE APPLICATION JIG AND TAPE SCALE APPLICATION METHOD

(71) Applicant: Mitutoyo Corporation, Kawasaki-shi, Kanagawa (JP)

(72) Inventors: Tomoyuki Otake, Kawasaki (JP); Yasuo Yamaguchi, Kawasaki (JP)

(73) Assignee: MITUTOYO CORPORATION, Kawasaki (JP)

(*) Notice: Subject to any disclaimer, the term of this patent is extended or adjusted under 35 U.S.C. 154(b) by 225 days.

(21) Appl. No.: 14/731,760

(22) Filed: Jun. 5, 2015

(65) Prior Publication Data
US 2015/0354935 A1 Dec. 10, 2015

(30) Foreign Application Priority Data
Jun. 9, 2014 (JP) ................. 2014-118411

(51) Int. Cl.
*G01B 3/02* (2006.01)
*G01B 3/10* (2006.01)
*G01D 5/347* (2006.01)

(52) U.S. Cl.
CPC ....... *G01B 3/1084* (2013.01); *G01D 5/34707* (2013.01)

(58) Field of Classification Search
CPC .............................. G01B 3/1084; B23P 19/10
USPC ...................... 33/701, 706; 29/464
See application file for complete search history.

(56) References Cited

U.S. PATENT DOCUMENTS

| | | | | |
|---|---|---|---|---|
| 2,742,705 A * | 4/1956 | Gelardi | ............ | G01B 3/10 33/758 |
| 4,559,707 A * | 12/1985 | Oberhans | ............ | G01B 3/002 33/702 |
| 5,063,685 A * | 11/1991 | Morrison | ............ | G01B 3/004 156/361 |
| 5,092,058 A * | 3/1992 | Luttmer | ............ | G01B 7/02 33/706 |
| 5,820,725 A * | 10/1998 | Maeda | ............ | B65H 37/005 156/391 |
| 6,349,481 B1 * | 2/2002 | Nelle | ............ | G01D 5/34707 33/701 |
| 6,585,023 B2 * | 7/2003 | Azuhata | ............ | B60R 13/00 156/574 |
| 7,134,177 B2 * | 11/2006 | Tondorf | ............ | B23Q 3/186 29/464 |
| 7,152,651 B2 * | 12/2006 | Fujiwara | ............ | B65H 37/005 156/574 |
| 7,287,567 B2 * | 10/2007 | Fujiwara | ............ | B65H 37/005 156/166 |
| 2014/0338208 A1 * | 11/2014 | Sugamata | ............ | G01D 5/24442 33/706 |
| 2016/0187117 A1 * | 6/2016 | Otsuka | ............ | G01B 3/1071 33/770 |

* cited by examiner

*Primary Examiner* — Christopher Fulton
(74) *Attorney, Agent, or Firm* — Rankin, Hill & Clark LLP

(57) ABSTRACT

A tape scale application jig includes a frame having a U-shaped cross section; a scale holder that is disposed inside the frame and to which a tape scale is temporarily attached; a handle that is disposed outside the frame and that is connected to the scale holder via a through-hole formed in a web portion of the frame; a spring that is provided so as to separate the handle and the web portion from each other; and a positioning reference disposed on at least one of two flange portions of the frame.

16 Claims, 4 Drawing Sheets

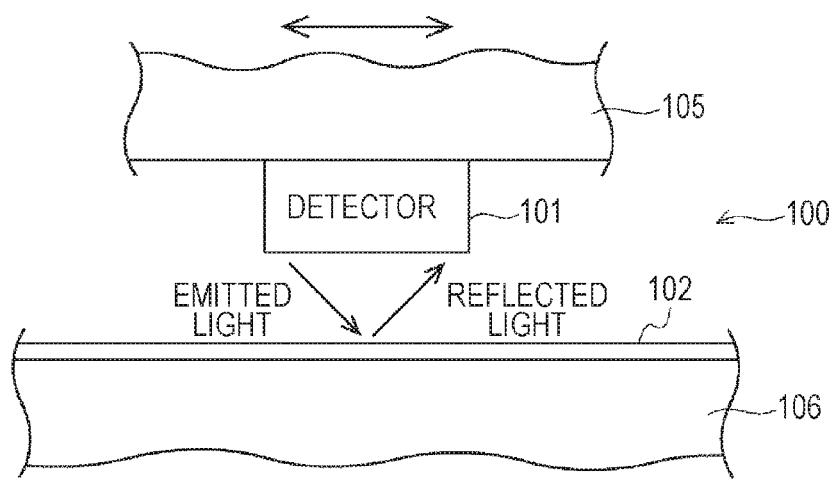
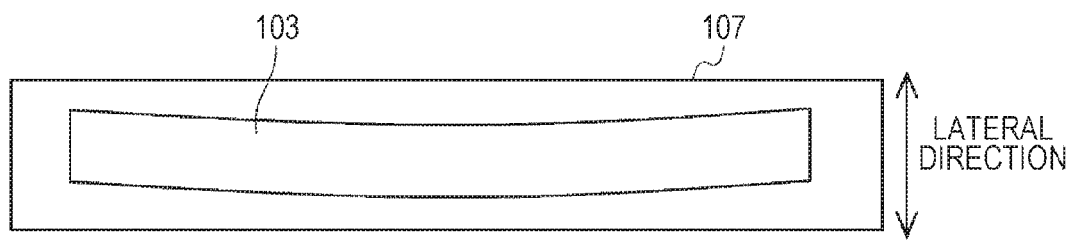
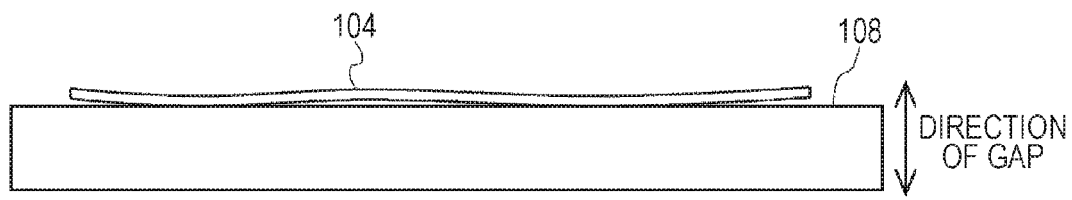

TAPE SCALE APPLICATION JIG AND TAPE SCALE APPLICATION METHOD

CROSS REFERENCES TO RELATED APPLICATIONS

The present invention contains subject matter related to Japanese Patent Application No. 2014-118411 filed in the Japan Patent Office on Jun. 9, 2014, the entire contents of which are incorporated herein by reference.

BACKGROUND OF THE INVENTION

1. Field of the Invention

The present invention relates to a tape scale, and in particular, to a jig and a method for applying a tape scale to an object.

2. Description of the Related Art

Optical encoders for detecting relative movement of two members are known. Referring to FIG. 1, an optical encoder 100 includes a detector 101, which is attached a member 105, and a tape scale 102, which is applied to another member 106. An absolute scale pattern, an incremental scale pattern, or both of these patterns is/are formed on the tape scale 102. The detector 101 emits light to the tape scale 102, receives light reflected by the tape scale 102, and outputs a detection signal on the basis of the reflected light.

Next, a method of applying a tape scale by using an existing tape scale application jig will be described. The tape scale is passed through the tape scale application jig, and the tape scale is applied to an object by sliding the application jig while peeling off a backing tape, which protects an adhesive layer on the back side of the tape scale (see, for example, Japanese Patent No. 2837483 (page 4 and FIGS. 5 to 8)). Before applying of the tape scale, it is necessary to extend the tape scale beyond both ends of the application jig (see, for example, Japanese Patent No. 2837483 (FIG. 6)).

Therefore, the existing tape scale application jig has a problem in that it is incapable of applying a tape scale that has a length smaller than the entire length of the application jig.

In a case of applying a tape scale without using an application jig, the following problems arise. First, the tape scale may become curved in a lateral direction or in a direction of a gap. Second, the tape scale may be applied to a position that is displaced from a desirable position. FIG. 2 illustrates an example in which a tape scale 103 has become curved in the lateral direction when the tape scale 103 was applied to a member 107. FIG. 3 illustrates an example in which a tape scale 104 has become curved in the direction of a gap when the tape scale 104 was applied to a member 108.

SUMMARY OF THE INVENTION

Accordingly, an objective of the present invention is to provide a tape scale application jig and a tape scale application method with which a short tape scale can be appropriately applied to an object.

According to a first aspect of the present invention, a tape scale application jig includes a frame having a U-shaped cross section, a scale holder that is disposed inside the frame and to which a tape scale is temporarily attached, a handle that is disposed outside the frame and that is connected to the scale holder via a through-hole formed in a web portion of the frame, a spring that is provided so as to separate the handle and the web portion from each other, and a positioning reference disposed on at least one of two flange portions of the frame.

Preferably, the scale holder includes a magnet that attracts the tape scale.

Preferably, the scale holder has a groove formed therein, the groove having a width larger than that of the tape scale and having a depth smaller than a thickness of the tape scale.

Preferably, the positioning reference includes two reference pins that are disposed on one of the two flange portions.

According to a second aspect of the present invention, a tape scale application method includes a temporary attachment step of temporarily attaching a tape scale, which has a double-sided tape affixed thereto, to a tape scale application jig; a peel-off step of removing a release liner from the double-sided tape; a positioning step of positioning the tape scale application jig relative to an object; and an application step of applying the tape scale to the object by using the double-sided tape. The tape scale application jig includes a frame having a U-shaped cross section, a scale holder that is disposed inside the frame, a handle that is disposed outside the frame and that is connected to the scale holder via a through-hole formed in a web portion of the frame, a spring that is provided so as to separate the handle and the web portion from each other, and a positioning reference disposed on at least one of two flange portions of the frame. In the temporary attachment step, the tape scale is temporarily attached to the scale holder. In the positioning step, the tape scale application jig is positioned relative to the object by using the positioning reference. In the application step, the double-sided tape is made to have close contact with the object by pushing the handle toward the web portion.

Preferably, the scale holder includes a magnet that attracts the tape scale. In this case, in the temporary attachment step, the tape scale is temporarily attached to the scale holder by using the magnet.

Preferably, the scale holder has a groove formed therein, the groove having a width larger than that of the tape scale and having a depth smaller than a thickness of the tape scale. In this case, in the temporary attachment step, the tape scale is disposed in the groove.

Preferably, the positioning reference includes two reference pins that are disposed on one of the two flange portions, and the object has two reference holes formed therein. In this case, in the positioning step, the two reference pins are inserted into the two reference holes.

With the present invention, a tape scale application jig and a tape scale application method with which a short tape scale can be appropriately applied to an object can be provided.

BRIEF DESCRIPTION OF THE DRAWINGS

FIG. 1 is a conceptual diagram illustrating the principle of a prior art optical encoder.

FIG. 2 is a schematic view illustrating an example in which a prior art tape scale has been curved in a lateral direction.

FIG. 3 is a schematic view illustrating an example in which a prior art tape scale has been curved in a direction of a gap.

DESCRIPTION OF THE PREFERRED EMBODIMENTS

Figure 4:
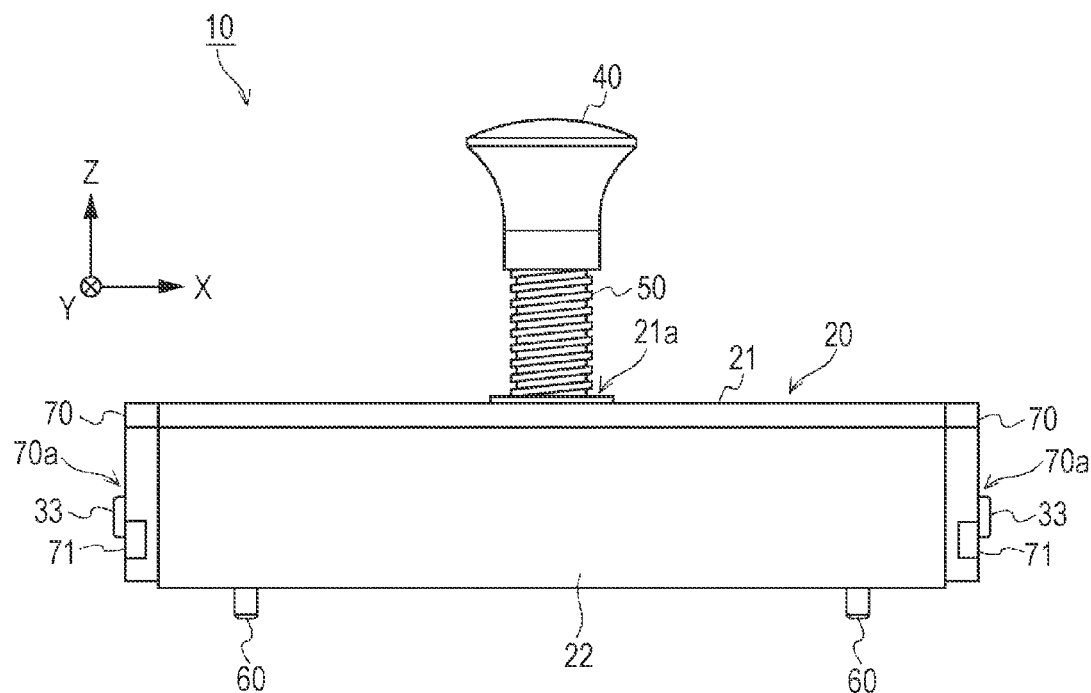
FIG. 4 is a front view of a tape scale application jig according to an embodiment.
Figure 5:
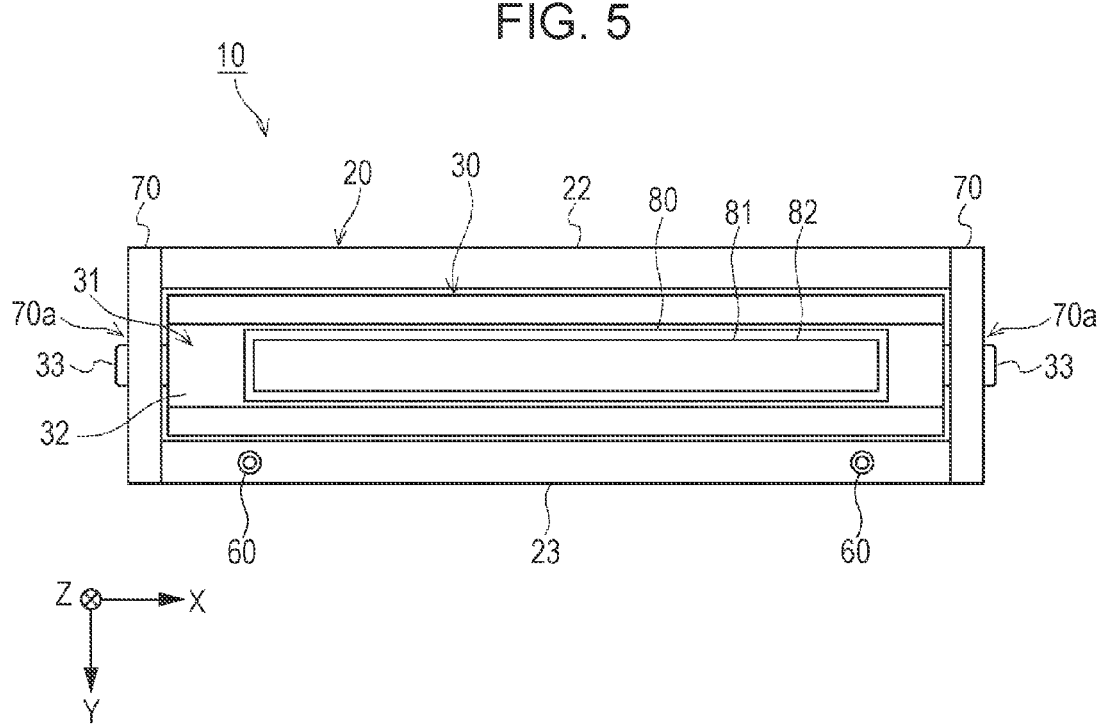
FIG. 5 is a bottom view of the tape scale application jig according to the embodiment.
Figure 6:
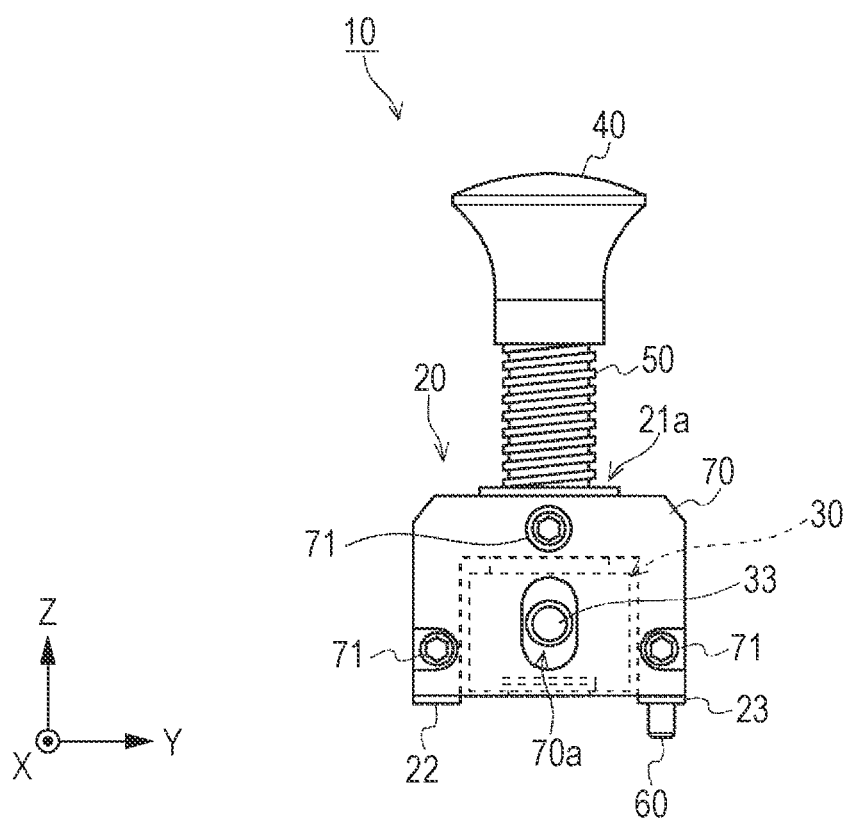
FIG. 6 is a side view of the tape scale application jig according to the embodiment.
Figure 7:
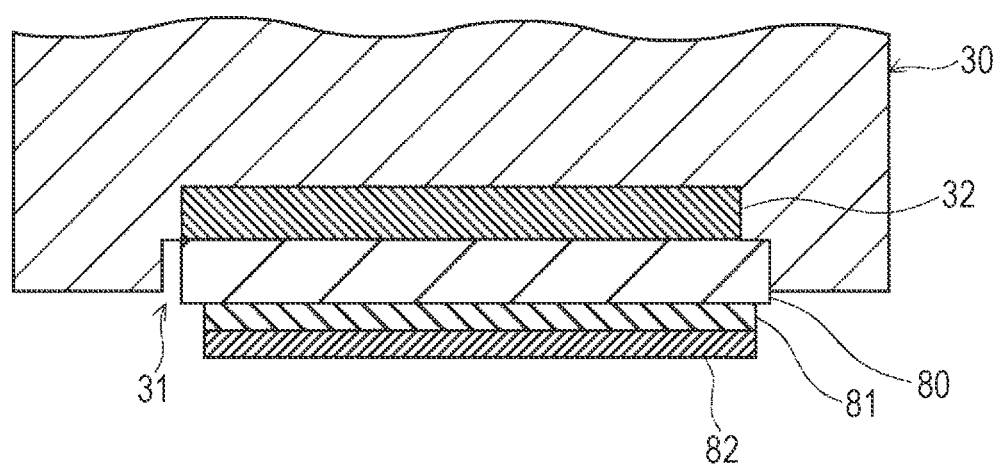
FIG. 7 is a cross-sectional view of a scale holder of the tape scale application jig according to the embodiment.

Hereinafter, an embodiment of the present invention will be described with reference to the drawings. First, referring to FIGS. 4 to 7, the structure of a tape scale application jig 10 according to the embodiment will be described. FIG. 4 is a front view of the tape scale application jig 10. FIG. 5 is a bottom view of the tape scale application jig 10. FIG. 6 is a side view of the tape scale application jig 10. FIG. 7 is a cross-sectional view of a scale holder 30 of the tape scale application jig 10.

Referring to FIGS. 4 to 6, the tape scale application jig 10 includes a frame 20 having a U-shape, the scale holder 30 disposed inside the frame 20, a handle 40 disposed outside the frame 20, a spring 50 disposed between the handle 40 and the frame 20, positioning references 60 disposed on the frame 20, and end face members 70 disposed at ends of the frame 20 in the longitudinal direction. The end face members 70 are fixed to the frame 20 with bolts 71.

The frame 20 has a longitudinal direction parallel to the X-axis. The frame 20 has a U-shaped cross section perpendicular to the X-axis. The frame 20 includes a web portion 21 and flange portions 22 and 23. The flange portions 22 and 23 are disposed so as to be separated from each other in the Y-axis direction. A through-hole 21a is formed in the web portion 21. The handle 40 is connected to the scale holder 30 via the through-hole 21a. The handle 40 and the scale holder 30 can be moved relative to the frame 20 in the Z-axis direction as a unit. The spring 50 is provided so as to separate the handle 40 and the web portion 21 from each other in the Z-axis direction. In other words, the spring 50 is provided so as to make the scale holder 30 and the web portion 21 approach each other in the Z-axis direction. The X-axis, the Y-axis, and the Z-axis are perpendicular to each other.

A groove 31, to which a tape scale 80 is to be temporarily attached, is formed in the scale holder 30. The longitudinal direction of the groove 31 is parallel to the X-axis. The width direction of the groove 31 is parallel to the Y-axis. The depth direction of the groove 31 is parallel to the Z-axis. The scale holder 30 includes a magnet 32, which attracts the tape scale 80, and guide pins 33. Elongated holes 70a, which guide the guide pins 33 along the Z-axis, are formed in the end face member 70. The positioning references 60 are, for example, two reference pins disposed on the flange portion 23.

Referring to FIG. 7, the tape scale 80 is temporarily attached to the scale holder 30 by using the magnet 32 in a state in which the tape scale 80 is disposed in the groove 31. The width of the groove 31 is slightly larger than that of the tape scale 80. The depth of the groove 31 is smaller than the thickness of the tape scale 80. The tape scale 80 has a double-sided tape 81 affixed thereto, and the double-sided tape 81 is covered by a release liner 82. The tape scale 80 corresponds to the tape scale 102 described above.

Hereinafter, a tape scale application method performed by using the tape scale application jig 10 will be described.

Referring to FIGS. 5 and 7, the tape scale 80, to which the double-sided tape 81 with the release liner 82 has been affixed, is temporarily attached to the tape scale application jig 10. To be specific, the tape scale 80 is temporarily attached to the scale holder 30 by using the magnet 32 in a state in which the tape scale 80 is disposed in the groove 31 formed in the scale holder 30. By using the groove, 31, a user determines the position of the tape scale 80 in the Y-axis direction and makes the longitudinal direction of the tape scale 80 be parallel to the X-axis. It is easy to dispose the tape scale 80 in the groove 31, because the width of the groove 31 is larger than that of the tape scale 80. The user can finely adjust the position of the tape scale 80, which is disposed in the groove 31, because the tape scale 80 is temporarily attached by using the magnet 32. Note that the position of the tape scale 80 in the longitudinal direction (the X-axis direction) need not be adjusted as precisely as the position of the tape scale 80 in the width direction (the Y-axis direction) or the parallelism between the longitudinal direction of the tape scale 80 and the X-axis.

Subsequently, the release liner 82 is removed to expose an adhesive layer of the double-sided tape 81.

Figure 8:
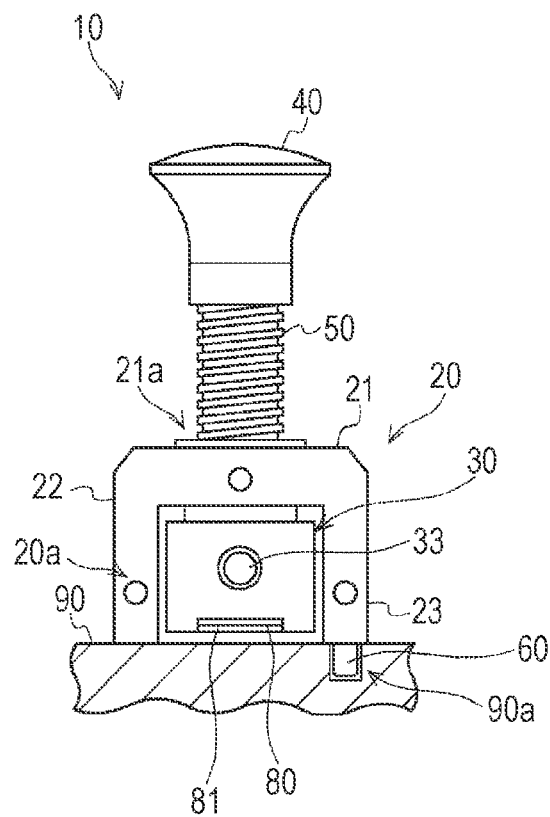
FIG. 8 is a schematic view illustrating a positioning step of a tape scale application method according to the embodiment.

Referring to FIG. 8, after the release liner 82 has been removed, the tape scale application jig 10 is positioned relative to an object 90, to which the tape scale 80 is to be applied, by using the positioning references 60. To be specific, the positioning references 60 of the tape scale application jig 10 are placed in positioning references 90a of the object 90. The positioning references 60 may be reference pins, and the positioning references 90a may be reference holes. In this case, interference between the positioning reference 90a and the detector can be prevented. The number of the positioning references 60 is preferably two, but may be one, or three or more. The positioning references 60 are preferably disposed on one of the flange portions 22 and 23, but may be disposed on both of the flange portions 22 and 23. Preferably, the number of the positioning references 90a is the same as that of the positioning references 60. As long as interference between the positioning reference 90a and the detector can be prevented, the positioning references 60 may be reference holes and the positioning references 90a may be reference pins.

Figure 9:
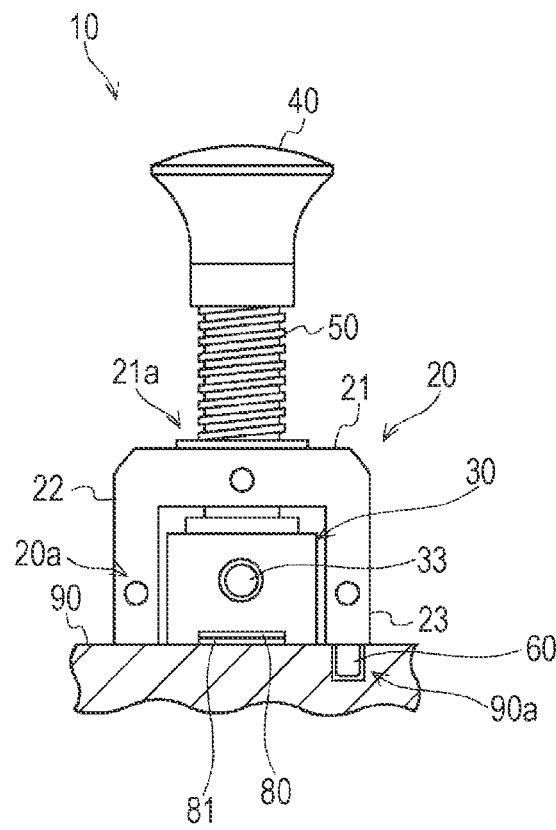
FIG. 9 is a schematic view illustrating an application step of the tape scale application method according to the embodiment.

In FIGS. 8 and 9, the end face members 70 are not illustrated in order to make the description easier to understand. Screw holes 20a, into which the bolts 71 are to be screwed, are formed in the frame 20.

Referring to FIG. 9, after the tape scale application jig 10 has been correctly positioned relative to the object 90, the tape scale 80 is applied to the object 90 by using the double-sided tape 81. To be specific, the handle 40 is pushed toward the web portion 21 to make the double-sided tape 81 to have close contact with the object 90. Since the depth of the groove 31 is smaller than the thickness of the tape scale 80, the double-sided tape 81 can have close contact with the object 90 without fail. When the user releases his/her hand from the handle 40, the scale holder 30 becomes separated from the tape scale 80 by the spring 50. Subsequently, the tape scale 80 is pressed against the object 90 by using a roller or the like.

According to the present embodiment, even if the length of the tape scale 80 is small, the tape scale 80 can be appropriately applied to the object 90.

The present invention is not limited to the embodiment described above, and the embodiment can be modified as necessary within the spirit and scope of the present invention. For example, in the embodiment described above, the magnet 32 is used to temporarily attach the tape scale 80 to the scale holder 30. Instead of the magnet 32, a suction mechanism or an adhesive layer, which has a weaker adhesive power than the double-sided tape 81, may be used. However, the magnet 32 is preferable to the suction mechanism and the adhesive layer, because the suction mechanism needs to be connected to a pump and the adhesive power of the adhesive layer may decrease with repeated use. The magnet 32 may be any of a sheet-shaped magnet and a block-shaped magnet. A plurality of marks may be placed at positions on the scale holder 30 that are arranged in the X-axis direction, and the marks may be used as guides for determining the position of the tape scale 80 in the X-axis direction.

What is claimed is:

1. A tape scale application jig comprising:
   a frame having a U-shaped cross section;
   a scale holder that is disposed inside the frame and to which a tape scale is temporarily attached;
   a handle that is disposed outside the frame and that is connected to the scale holder via a through-hole formed in a web portion of the frame;
   a spring that is provided so as to separate the handle and the web portion from each other; and
   a positioning reference disposed on at least one of two flange portions of the frame.

2. The tape scale application jig according to claim 1, wherein the scale holder includes a magnet that attracts the tape scale.

3. The tape scale application jig according to claim 2, wherein the scale holder has a groove formed therein, the groove having a width larger than that of the tape scale and having a depth smaller than a thickness of the tape scale.

4. The tape scale application jig according to claim 3, wherein the positioning reference includes two reference pins that are disposed on one of the two flange portions.

5. The tape scale application jig according to claim 2, wherein the positioning reference includes two reference pins that are disposed on one of the two flange portions.

6. The tape scale application jig according to claim 1, wherein the scale holder has a groove formed therein, the groove having a width larger than that of the tape scale and having a depth smaller than a thickness of the tape scale.

7. The tape scale application jig according to claim 6, wherein the positioning reference includes two reference pins that are disposed on one of the two flange portions.

8. The tape scale application jig according to claim 1, wherein the positioning reference includes two reference pins that are disposed on one of the two flange portions.

9. A tape scale application method comprising:
   a temporary attachment step of temporarily attaching a tape scale, to which a double-sided tape with a release liner has been affixed, to a tape scale application jig;
   a peel-off step of removing the release liner from the double-sided tape;
   a positioning step of positioning the tape scale application jig relative to an object; and
   an application step of applying the tape scale to the object by using the double-sided tape,
   wherein the tape scale application jig includes
      a frame having a U-shaped cross section,
      a scale holder that is disposed inside the frame,
      a handle that is disposed outside the frame and that is connected to the scale holder via a through-hole formed in a web portion of the frame,
      a spring that is provided so as to separate the handle and the web portion from each other, and
      a positioning reference disposed on at least one of two flange portions of the frame,
   wherein, in the temporary attachment step, the tape scale is temporarily attached to the scale holder,
   wherein, in the positioning step, the tape scale application jig is positioned relative to the object by using the positioning reference, and
   wherein, in the application step, the double-sided tape is made to have close contact with the object by pushing the handle toward the web portion.

10. The tape scale application method according to claim 9,
    wherein the scale holder includes a magnet that attracts the tape scale, and
    wherein, in the temporary attachment step, the tape scale is temporarily attached to the scale holder by using the magnet.

11. The tape scale application method according to claim 10,
    wherein the scale holder has a groove formed therein, the groove having a width larger than that of the tape scale and having a depth smaller than a thickness of the tape scale, and
    wherein, in the temporary attachment step, the tape scale is disposed in the groove.

12. The tape scale application method according to claim 11,
    wherein the positioning reference includes two reference pins that are disposed on one of the two flange portions,
    wherein the object has two reference holes formed therein, and
    wherein, in the positioning step, the two reference pins are inserted into the two reference holes.

13. The tape scale application method according to claim 10,
    wherein the positioning reference includes two reference pins that are disposed on one of the two flange portions,
    wherein the object has two reference holes formed therein, and
    wherein, in the positioning step, the two reference pins are inserted into the two reference holes.

14. The tape scale application method according to claim 9,
    wherein the scale holder has a groove formed therein, the groove having a width larger than that of the tape scale and having a depth smaller than a thickness of the tape scale, and
    wherein, in the temporary attachment step, the tape scale is disposed in the groove.

15. The tape scale application method according to claim 14,
    wherein the positioning reference includes two reference pins that are disposed on one of the two flange portions,
    wherein the object has two reference holes formed therein, and
    wherein, in the positioning step, the two reference pins are inserted into the two reference holes.

16. The tape scale application method according to claim 9,
    wherein the positioning reference includes two reference pins that are disposed on one of the two flange portions,
    wherein the object has two reference holes formed therein, and wherein, in the positioning step, the two reference pins are inserted into the two reference holes.

\* \* \* \* \*